(12) United States Patent
Phillips et al.

(10) Patent No.: US 6,874,536 B2
(45) Date of Patent: Apr. 5, 2005

(54) GAS SUPPLY APPARATUS

(75) Inventors: Robert John Phillips, Honiton (GB); David John Peacey, Yeovil (GB)

(73) Assignee: Honeywell Normalair-Garrett (Holdings) Limited, Yeovil (GB)

( * ) Notice: Subject to any disclaimer, the term of this patent is extended or adjusted under 35 U.S.C. 154(b) by 0 days.

(21) Appl. No.: 10/801,622

(22) Filed: Mar. 16, 2004

(65) Prior Publication Data

US 2004/0226621 A1 Nov. 18, 2004

Related U.S. Application Data

(63) Continuation of application No. PCT/GB03/00773, filed on Feb. 21, 2003.

(30) Foreign Application Priority Data

Mar. 1, 2002 (GB) .............................................. 0204884

(51) Int. Cl.$^7$ ................................................. F16K 1/00
(52) U.S. Cl. ................ 137/883; 137/514.7; 137/118.04
(58) Field of Search .......................... 137/87.04, 118.04, 137/514.7, 883; 251/50

(56) References Cited

U.S. PATENT DOCUMENTS 2,881,794 A * 4/1959 Baldwin ..................... 137/501
4,625,721 A    12/1986 Kavaloski et al.
5,280,131 A     1/1994 Sarro
6,164,310 A *  12/2000 Yamashita ............. 137/119.06

FOREIGN PATENT DOCUMENTS

BE  345935    11/1927
GB  2125534    3/1984

* cited by examiner

Primary Examiner—John Fox
(74) Attorney, Agent, or Firm—MacMillan, Sobanski & Todd, LLC

(57) ABSTRACT

An apparatus for supplying pressurized gas to a plurality of gas outlets from an upstream gas supply, in which each of the plurality of gas outlets in use is connected to a common gas feed line via a respective valve, each valve being adapted to close to prevent the flow of gas downstream of the valve in the event of the integrity of the feed line being breached downstream of the respective valve, to prevent the escape of gas from the breached feed line, and wherein each valve includes a valve member which is moveable into engagement with a valve seat to close the valve, and a valve member damping means to resist movement of the valve member into engagement with the valve seat.

10 Claims, 3 Drawing Sheets

GAS SUPPLY APPARATUS

CROSS-REFERENCE TO RELATED APPLICATIONS

Priority is claimed to United Kingdom patent application Ser. No. 0204884.1 filed Mar. 1, 2002, and to United Kingdom patent application Ser. No. filed. This is a continuation of International patent application No. PCT/GB03/00773 filed Feb. 21, 2003.

STATEMENT REGARDING FEDERALLY SPONSORED RESEARCH OR DEVELOPMENT

Not Applicable.

TECHNICAL FIELD

This invention relates to a gas supply apparatus and more particularly but not exclusively to a gas supply apparatus for supplying a breathable gas to aircrew and/or passengers in an aircraft in the event of a cabin decompression.

BACKGROUND OF THE INVENTION

It is known for such a breathable gas supply apparatus to include a plurality of gas outlets, e.g. breathing masks, each outlet being fed with gas from a feed line. The apparatus may include a plurality of such feed lines, each feed line feeding a plurality of gas outlets.

Each gas outlet is connected to its respective feed line via a "T" valve which permits the flow of gas in a cabin decompression situation from upstream of the "T" valve simultaneously to the gas outlet and to downstream of the "T" valve e.g. to other downstream "T" valves and gas outlets connected to the feed line.

To protect the gas supply in the event of a breach of the integrity of a feed line, each "T" valve includes a valve member which is moveable into engagement with a valve seat of the valve to close the valve and prevent the flow of gas to downstream of the valve in the event of a breach of the integrity of the feed line downstream of the "T" valve. Such a breach of integrity of a feed line may occur for example in the event of an engine burst when a part of the engine may penetrate the aircraft fuselage and damage or even sever the feed line, thus also causing decompression of the aircraft cabin, or some other calamitous event occurring.

To ensure that the breathing gas supply apparatus is brought to an operational condition as soon as possible after the onset of a cabin decompression, it is desirable to purge the feed line or lines of the apparatus which involves filling the feed line or lines with breathable gas. This may be achieved by providing a purge valve downstream of the gas outlets, which is openable for a short time to permit pressurized breathable gas to flow throughout the apparatus.

However, where conventional "T" valves are provided as described above to protect the apparatus in the event of a breach of integrity of the feed line, the valve members of the "T" valves tend to move to close the "T" valves, hindering the flow of breathable gas throughout the entire apparatus. Furthermore conventionally, the or each feed line includes a non-return valve downstream of the gas outlets connected to the feed line to isolate a damaged or severed feed line. Thus in the event of a breach of integrity of a feed line, the next upstream "T" valve will close to prevent the escape of breathable gas to downstream of the breach, and all gas outlets between the breach and the non-return valve will become unusable.

BRIEF SUMMARY OF THE INVENTION

According to a first aspect of the invention we provide an apparatus for supplying pressurized gas to a plurality of gas outlets from an upstream gas supply, in which each of the plurality of gas outlets in use is connected to a common gas feed line via a respective valve, each valve being adapted to close to prevent the flow of gas downstream of the valve in the event of the integrity of the feed line being breached downstream of the respective valve, to prevent the escape of gas from the breached feed line, and wherein each valve includes a valve member which is moveable into engagement with a valve seat to close the valve, and a valve member damping means to resist movement of the valve member into engagement with the valve seat.

Preferably, the damping means of each valve only delays valve member movement to close the valve so that in the event of a breach of the integrity of the feed line downstream of the valve, the valve member can after such delay, engage the valve seat to close the valve and prevent the escape of gas from the breached feed line downstream of the valve. However during a purging operation during which the apparatus is filled with gas, the delay permits gas to flow past the valve member downstream of the valve.

In one embodiment the damping means may include a sealed volume of gas, including a capsule and a bellows, the capsule and bellows communicating via an orifice, the valve member when moving towards the valve seat acting on the sealed volume to collapse the bellows and expel gas from the bellows through the orifice into the capsule, thus to damp valve member movement. Preferably though the damping means includes a closed ended cylinder containing a piston, there being a small orifice in the piston to allow a controlled flow of gas therethrough, the valve member acting on the piston when moved to close the valve, resulting in piston movement which compresses gas behind the piston, which compressed gas is gradually allowed to escape from the cylinder via the orifice.

However other mechanisms for resisting valve member movement and thus delaying engagement of the valve member with the valve seat may alternatively be used.

Preferably the apparatus is configured so that pressurized gas may be fed to both the upstream and downstream sides of the valves, and each valve member is moveable into engagement with a second valve seat of a respective valve to close the valve to prevent the flow of gas to upstream of the valve in the event of the integrity of the feed line being breached upstream of the respective valve. In such an arrangement, the non return valve conventionally provided to isolate a damaged or severed feed line from the remainder of the apparatus, may be dispensed with, and furthermore, gas outlets downstream of the breach will remain usable.

Each valve may be of a "T" configuration, permitting the flow of gas through the valve when the valve member is out of engagement with the or either valve seat of the valve, whilst permitting gas flow from upstream or downstream of the valve to the gas outlet even in the event of the valve member being in engagement with the or either valve seat.

The invention is particularly applicable to a gas supply apparatus where the gas is a breathable gas, and the apparatus is provided in an aircraft to supply breathable gas in the event of an emergency situation, such as a cabin decompression.

According to a second aspect of the invention we provide a method of operating an apparatus for supplying pressurized gas to a plurality of gas outlets from an upstream gas supply, each of the plurality of gas outlets in use being connected to a common gas feed line via a respective valve, each valve being adapted to close to prevent the flow of gas downstream of the valve in the event of the integrity of the feed line being breached downstream of the respective valve, to prevent the escape of gas from the breached feed line, and wherein each valve includes a valve member which is moveable into engagement with a valve seat to close the valve, and the method including damping valve member movement to resist movement of the valve member into engagement with the valve seat at least during filling of the apparatus with gas.

According to a third aspect of the invention we provide an aircraft having a gas supply system for supplying breathable gas in the event of an emergency occurring according to the first aspect of the invention.

According to a fourth aspect of the invention we provide a valve of "T" configuration including a valve member moveable into engagement with a valve seat to prevent the flow of fluid through the valve from upstream to downstream of the valve, whilst permitting the flow of fluid from upstream to an outlet of the valve, and wherein the valve includes a damping means which resists valve member movement into engagement with the valve seat.

BRIEF DESCRIPTION OF THE DRAWINGS

The invention will now be described with reference to the accompanying drawings in which.

DETAILED DESCRIPTION OF THE INVENTION

Figure 1:
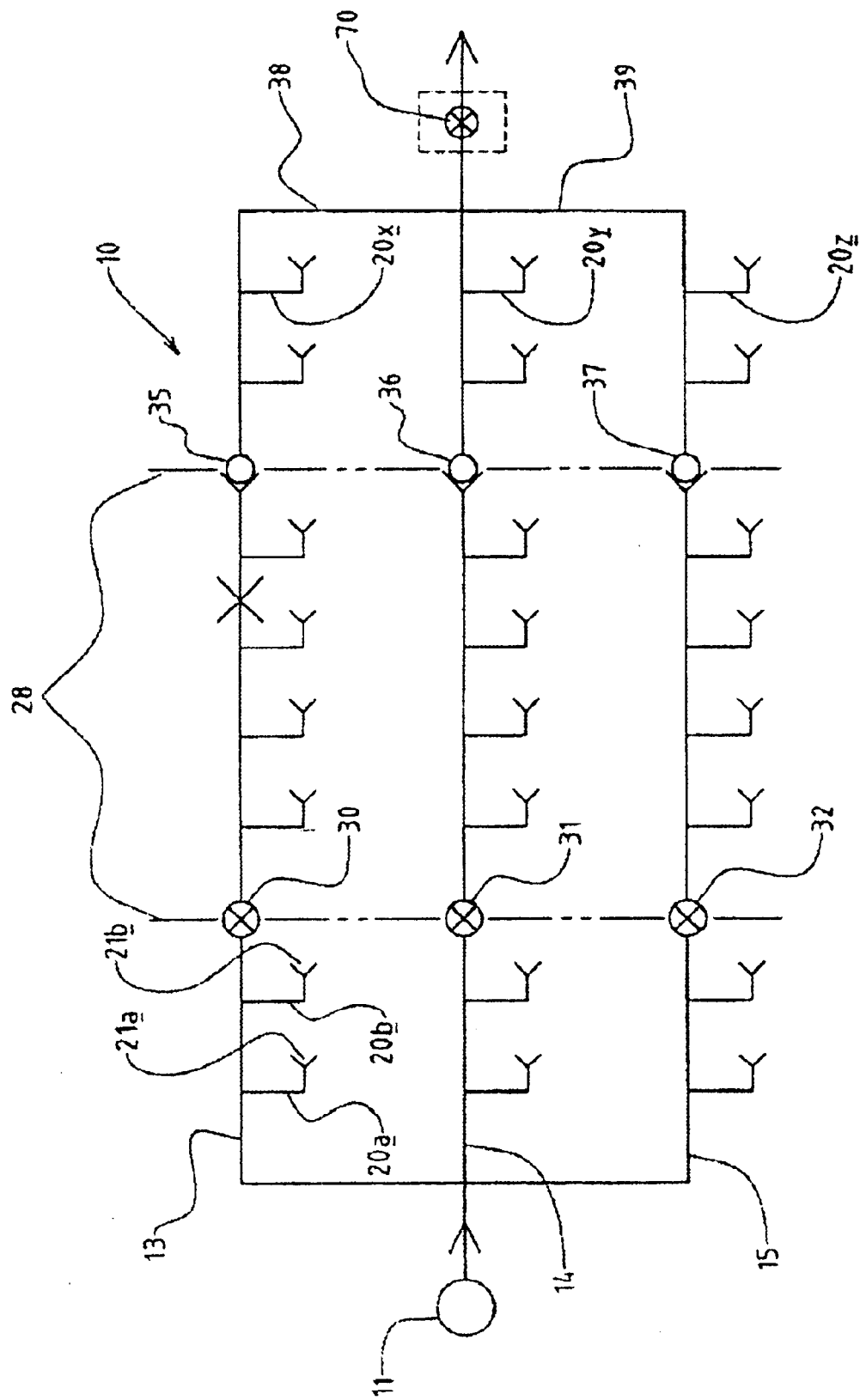
FIG. 1 is an illustrative view of a prior art gas supply apparatus.

Referring to the drawings, a gas supply apparatus 10 for supplying breathable gas i.e. pure or at least oxygen enriched breathing gas, to aircrew and/or passengers of an aircraft A in the event of for example, and emergency cabin decompression.

The apparatus 10 includes a gas supply 1 which may be of any kind such as one or more oxygen bottles which store compressed oxygen gas, a chemical plant for producing oxygen by chemical reaction, or a molecular sieve bed for enriching in oxygen e.g. compressed air bled from an aircraft engine, or even a ceramic oxygen generator, or a mixture of any of these.

In each case, on sensing an emergency decompression, the gas supply 11 is operated to supply oxygen or oxygen enriched gas to a plurality of feed lines 13, 14, 15, for distributing the gas supplied by the gas supply 11 throughout the aircraft crew/passenger cabin. In this example there are three feed lines 13, 14, 15 illustrated although there may be a single feed line or more than three feed lines as required.

Connected to each feed line are a plurality of gas supply outlets 20a, 20b etc., which typically include breathing masks 21a, 21b etc. It will be appreciated that the gas supply 11 will take a finite time after an emergency decompression occurring to become fully operational, and that even then, it will take some time for the gas to be distributed throughout the apparatus 10, so that most seriously for the most distant gas outlets, indicated at 20x, 20y and 20z, it may take a considerable time before the emergency gas supply to become available for use. Accordingly the breathing masks 21a, 21b etc. may each include a small immediate breathing gas supply to provide some breathing gas until the gas supplied by the gas supply 11 becomes available.

Each gas outlet 20a, 20b etc. is connected to a feed line 13, 14, 15 by a respective "T" valve 25 which is provided to protect the apparatus 10 in the event that any of the feed lines 13, 14, 15 becomes damaged or even is severed, thus breaching the integrity of the feed line 13, 14, 15, in the event of a calamitous situation such as an engine burst as a result of which a part of the engine could penetrate the cabin, causing an emergency decompression.

Conventional such "T" valves 25 include a valve member which is balanced into a neutral position, to allow gas to flow through the valve 25 from upstream of the valve 25 to downstream of the valve, and to allow gas to flow to the respective gas outlet 20a, 20b etc. However in the event of the integrity of a feed line 13, 14, 15 being breached, differential pressure experienced by the valve member will cause the valve member of the next upstream valve 25, to move into engagement with a valve seat to close the valve so that gas cannot flow from upstream of the valve 25 to downstream of the valve 25 and escape from the breached feed line. However the valve 25 may still permit gas from upstream of the valve 25 to flow to the respective gas outlet 20a, 20b of the valve 25.

Damage to or severing of a feed line 13, 14, 15 due to engine burst is most likely to occur in regions of the aircraft fuselage close to the engine and accordingly further to protect particularly vulnerable regions of the apparatus 10, isolating valves are provided.

In this example, in each feed line 13, 14, 15 immediately adjacent and upstream of such a particularly vulnerable region 28 there is provided an on/off valve 30, 31, 32 which may be closed to isolate the feed line 13, 14, 15 region 28 downstream. Also, in each feed line 13, 14, 15 immediately adjacent and downstream of such particularly vulnerable region 28, there is a non return valve 35, 36, 37.

It will be appreciated that by virtue of this configuration, in the event of a breach of say, feed line 13 at point X, the gas supply to all of the gas outlets 20 downstream of the breach X so far as the non return valve 35, will be cut-off. Gas outlets downstream of the non return valve 35 may continue to be supplied with gas from cross feed lines 38, 39.

Thus the conventional apparatus 10 described with reference to FIG. 1 has two major problems, namely the time it takes to fill the apparatus with gas from the gas supply 11 in the event of an emergency, and the loss of what could be a substantial number of gas outlets 20a, 20b etc. in the event of a breach of the integrity of a feed line 13, 14, 15.

Figure 2:
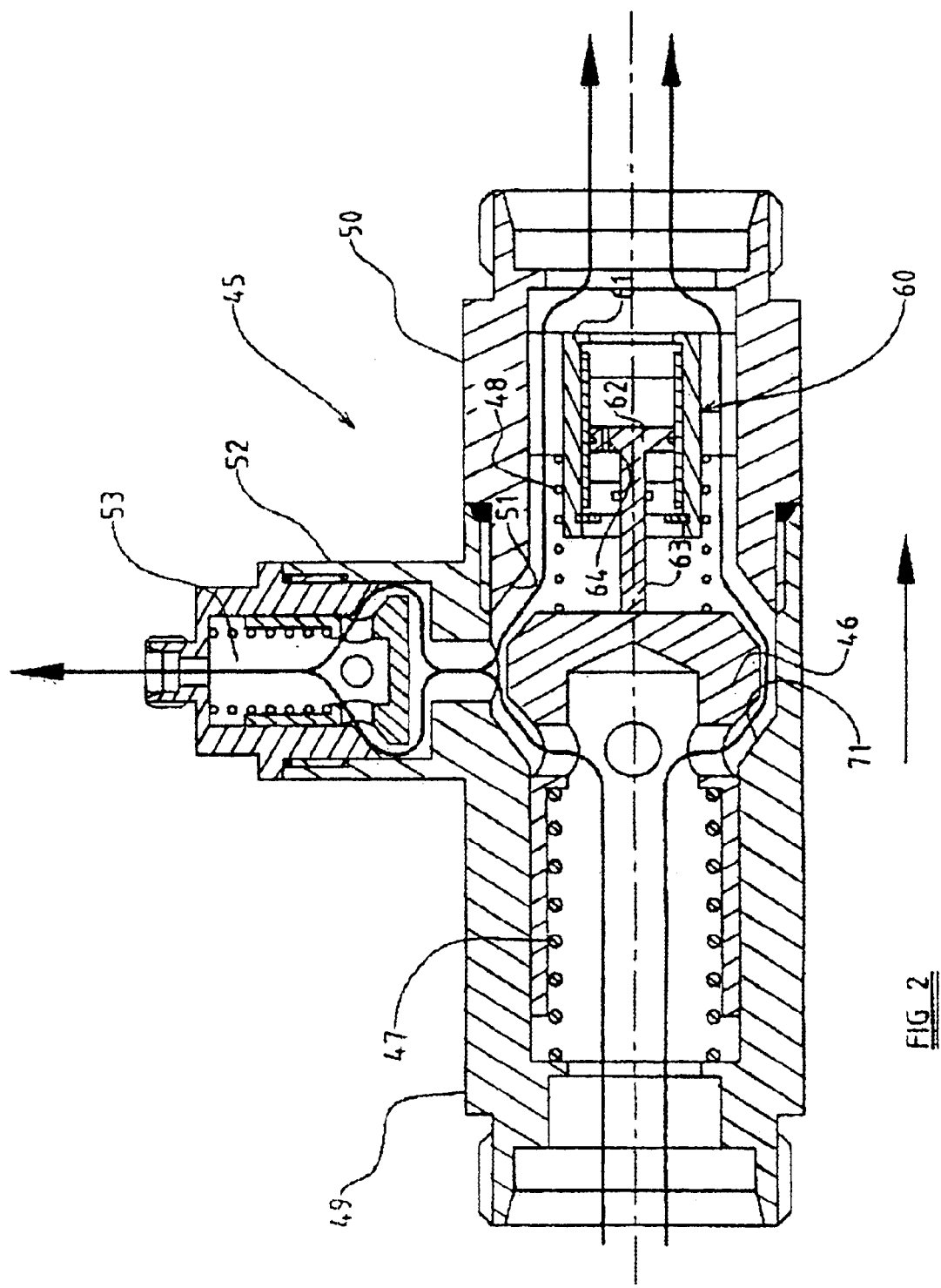
FIG. 2 is an illustrative cross sectional view through a valve which may be used in an apparatus in accordance with the invention.
Figure 3:
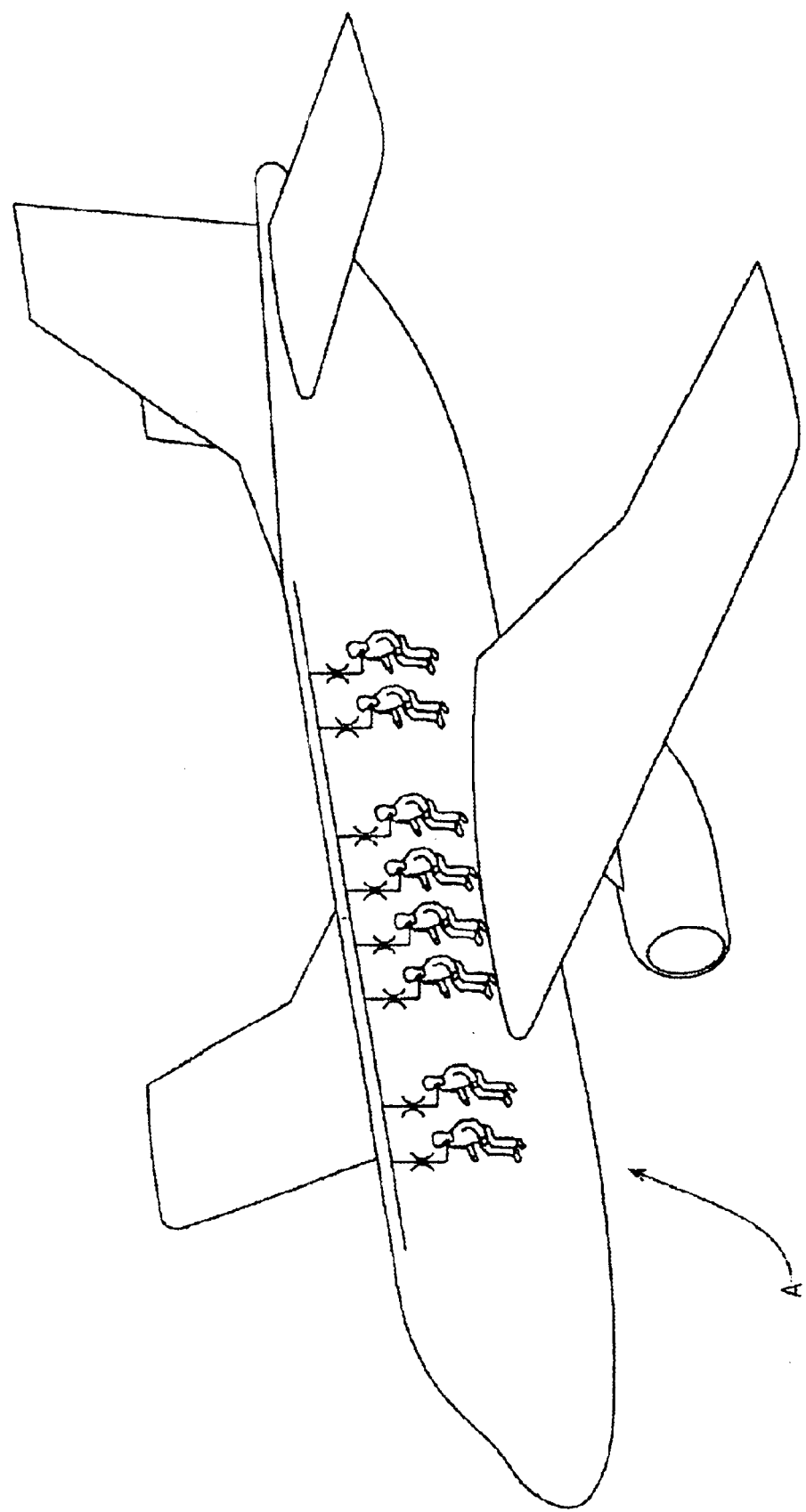
FIG. 3 is an illustrative view of an aircraft including the gas supply apparatus of FIG. 1.

Referring now to FIG. 2 there is shown a "T" valve 45 which may be used in place of each of the "T" valves 25 shown in FIG. 1, to reduce or overcome these problems.

The "T" valve 45 includes a balanced valve member 46. The valve member 46 is balanced by springs 47, 48 which act on either side of the valve member 46 into a neutral position as shown in the figure. In this position, gas from an upstream limb 49 of the valve 45 may flow past the valve member 46 to a downstream limb 50 of the valve 45 and hence to the apparatus downstream of the valve 45. Also, gas may flow past the valve member 46 to a gas outlet limb 52 to which a breathing mask is in use connected. The gas outlet limb 52 may include a one-way valve 53 which may operate conventionally and does not form a part of this invention.

Thus in the event of an emergency decompression, gas may flow through the valve 46 and to the outlet limb 52.

In the event of a breach of the integrity of the feed line in which the valve 56 is provided, immediately downstream of the valve 45, the valve member 46 will experience a pressure differential on either side, with higher pressure gas from the supply 11 acting on the left hand side as seen in the figure, of the valve member 46, and low pressure at the right hand side due to the breach. Accordingly the valve member 46 will be moved to the right towards a valve seat 51 to close the valve 46 and prevent the flow of gas escaping from the apparatus 10 by flowing past the valve member 46 to the breach.

However in accordance with the invention, such valve member 46 movement is resisted by a damping means which is indicated at 60.

The function of the damping means 60 is not primarily to resist valve member 46 movement in the event of a feed line 13, 14, 15 breach, but to permit gas from the gas supply 11 to be distributed more quickly through the apparatus 10 in the event of an emergency decompression as hereinafter explained.

Resisting valve member 46 movement will result in a greater loss of gas from the apparatus 10 in the event of a feed line breach, than with a conventional "T" valve 25 but valve members 46 in valves 46 upstream of the valve closest to the breach will be less affected by the breach downstream with there being less risk of valves upstream of the valve closest to the breach closing while the pressure in the affected feed line 13, 14, 15 balances.

In accordance with the invention, in the event of an emergency decompression, the apparatus 10 is purged, by which we mean that the feed lines 13, 14, 15 etc. are all filled rapidly with gas supplied from the gas supply 11. Purging is achieved by opening a purging valve which is indicated at 70 in FIG. 1 (although this may not be present in the conventional apparatus 10). Thus there is less resistance to the gas flowing throughout the apparatus 10, and stale gas which may be present in the feed lines 13, 14, 15 will be purged from the apparatus 10 by the flowing gas from the gas supply 11, via the purge valve 70.

By virtue of the damping means 60, as the gas begins to flow during purging, the tendency of the valve member 46 to move to the right to close the valve 45 is resisted, at least until the gas pressure in the feed line 13, 14 or 15 builds up sufficiently to overcome the resistance of the damping means 60. Thus until the valve 45 closes, gas may flow past the valve member 46 to downstream of the valve 45 and thus the provision of the damping means 60 facilitates the rapid purging of the apparatus 10.

After a short predetermined purging time, the purging valve 70 will be closed to allow pressure to build up in the apparatus 10 and to balance, at which point the valve members 46 will be returned by their balancing springs to their neutral positions.

Preferably, the valve member 46 movement is damped so that purging is completed before any of the valve members engage their valve seats 51.

In this example the damping means 60 includes a closed ended cylinder 61 containing a piston 62, there being a small orifice 64 in the piston 62 to allow a controlled flow of gas therethrough.

The piston 62 includes a piston rod 63 upon which the valve member 46 bear as the valve member 46 moves to the right, so that the piston 62 will be moved in the cylinder 61 to compress the gas behind the piston 62. The compressed gas is gradually allowed to escape from the cylinder 61 via the orifice 64. Thus valve member 46 movement to the right is damped or resisted but not prevented altogether.

The valve 45 is a bi-directional valve in that a second valve seat 71 is provided, with which the valve member 46 may be brought into engagement if the valve member 46 experiences a pressure differential in which the higher pressure is on the right hand side of the valve member 46 as seen in the figure.

This could occur due to a feed line 13, 14, 15 breach occurring immediately upstream of the valve 45. When the valve member 46 is in engagement with the second upstream seat 71, gas flow through the valve 45 is prevented, but gas may flow from the downstream limb 50 of the valve 45 to the gas outlet limb 52 past the valve member 46.

Thus in accordance with the invention, it is desirable not to provide the non-return valves indicated at 35, 36 and 37 in FIG. 1, so that gas outlets 20a, 20b etc., downstream of the feed line breach can be fed with breathing gas via the cross feed lines 38, 39.

Moreover, the on/off valves 30, 31, 32 in the feed lines 13, 14, 15 need not be provided in the apparatus 10 where the "T" valves 45 of FIG. 2 are provided, but the apparatus 10 will be protected in the event of a feed line 13, 14, 15 breach by the nearest upstream and downstream bi-directional valves 45 closing to isolate the breach thus resulting in the loss of few gas outlets 20a, 20b etc. than in a conventional apparatus. Furthermore purging of the apparatus 10 is substantially facilitated by the provision of damping means 60.

Various modifications may be made without departing from the scope of the invention. For example the apparatus configurations described are purely exemplary and a gas supply apparatus 10 in accordance with the invention may include alternative configurations in terms of the numbers of gas outlets 20a, 20b and feed lines 13, 14, 15 etc.

Different configuration damping means 60 may be provided to resist and hence delay closing of the valves 35. For example, in another embodiment, the damping means 60 may include a sealed volume of gas, including a capsule and a bellows, the capsule and bellows communicating via an orifice, the valve member 46 when moving towards the valve seat 51 acting on the sealed volume to collapse the bellows and expel gas from the bellows through the orifice into the capsule, thus to damp valve member 46 movement. However other mechanisms for resisting valve member 46 movement and thus delaying engagement of the valve member 46 with the valve seat 51 may alternatively be used.

The particular arrangements of valve seats 57, 71 and valve member 46 are only exemplary too and may take other forms.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. An apparatus for supplying pressurized gas to a plurality of gas outlets from an upstream gas supply, in which each of the plurality of gas outlets in use is connected to a common gas feed line via a respective valve, each valve being adapted to close to prevent the flow of gas downstream of the valve in the event of the integrity of the feed line being breached downstream of the respective valve, to prevent the escape of gas from the breached feed line, and wherein each valve includes a valve member which is moveable into engagement with a valve seat to close the valve, and a valve member damping means to resist movement of the valve member into engagement with the valve seat.

2. An apparatus according to claim 1 wherein the damping means resists movement of the valve member to close the valve during a purging operation.

3. An apparatus according to claim 1 wherein the damping means of each valve only delays valve member movement to close the valve so that in the event of a breach of the integrity of the feed line downstream of the valve, the valve member can after such delay, engage the valve seat to close the valve and prevent the escape of gas from the breached feed line downstream of the valve.

4. An apparatus according to claim 1 wherein the damping means includes a closed ended cylinder containing a piston, there being a small orifice in the piston to allow a controlled flow of gas therethrough, the valve member acting on the piston when moved to close the valve, resulting in piston movement which compresses gas behind the piston, which compressed gas is gradually allowed to escape from the cylinder via the orifice.

5. An apparatus according to claim 1 wherein the apparatus is configured so that pressurized gas is fed to both the upstream and downstream sides of the valves, and each valve member is moveable into engagement with a second valve seat of a respective valve to close the valve to prevent the flow of gas to upstream of the valve in the event of the integrity of the feed line being breached upstream of the respective valve.

6. An apparatus according to claim 5 wherein each valve is of a "T" configuration, permitting the flow of gas through the valve when the valve member is out of engagement with the or either valve seat of the valve, whilst permitting gas flow from upstream or downstream of the valve to the gas outlet even in the event of the valve member being in engagement with the or either valve seat.

7. An apparatus according to claim 1 which is a gas supply apparatus for supplying a breathable gas, and the apparatus is provided in an aircraft to supply breathable gas in the event of an emergency situation.

8. A method of operating an apparatus for supplying pressurized gas to a plurality of gas outlets from an upstream gas supply, each of the plurality of gas outlets in use being connected to a common gas feed line via a respective valve, each valve being adapted to close to prevent the flow of gas downstream of the valve in the event of the integrity of the feed line being breached downstream of the respective valve, to prevent the escape of gas from the breached feed line, and wherein each valve includes a valve member which is moveable into engagement with a valve seat to close the valve, and the method including damping valve member movement to resist movement of the valve member into engagement with the valve seat at least during filling of the apparatus with gas.

9. An aircraft having a gas supply system for supplying breathable gas in the event of an emergency occurring, there being a plurality of gas outlets and an upstream gas supply, each of the plurality of gas outlets in use, being connected to a common gas feed line via a respective valve, each valve being adapted to close to prevent the flow of gas downstream of the valve in the event of the integrity of the feed line being breached downstream of the respective valve, to prevent the escape of gas from the breached feed line, and wherein each valve includes a valve member which is moveable into engagement with a valve seat to close the valve, and a valve member damping means to resist movement of the valve member into engagement with the valve seat.

10. A valve of "T" configuration including a valve member moveable into engagement with a valve seat to prevent the flow of fluid through the valve from upstream to downstream of the valve, whilst permitting the flow of fluid from upstream to an outlet of the valve, and wherein the valve includes a damping means which resists valve member movement into engagement with the valve seat.

* * * * *